3,152,045
COMPOSITION AND METHOD FOR ANGINA PECTORIS THERAPY
John James Vance, Park Ridge, and Gerhard Zbinden, Essex Fells, N.J., assignors to Hoffmann-La Roche Inc., Nutley, N.J., a corporation of New Jersey
No Drawing. Filed May 1, 1962, Ser. No. 191,429
7 Claims. (Cl. 167—65)

The present invention relates to therapeutic compositions. More particularly, the present invention relates to therapeutic compositions containing chlordiazepoxide and pentaerythritol tetranitrate.

The present compositions are useful in the treatment of angina pectoris. Heretofore nitroglycerine has been the drug of choice for eliminating or reducing the number and extent of the angina attacks. However, a disadvantage of the nitroglycerine therapy lies in the short duration of action of the nitroglycerine. Other drugs which have a longer duration of action, such as pentaerythritol tetranitrate, have been employed, but these drugs have less activity in the treatment of angina pectoris than nitroglycerine.

It has been found that chlordiazepoxide when used in combination with pentaerythritol tetranitrate markedly enhances the activity of the pentaerythritol tetranitrate in reducing the number and extent of angina attacks. This is surprising since chlordiazepoxide alone exhibits no known effects on the heart.

The method of treating a human being suffering from angina pectoris comprises treating a human being so afflicted with a composition containing chlordiazepoxide (7-chloro-2-methylamino-5-phenyl - 3H - 1,4 - benzodiazepine-4-oxide), or an acid addition salt thereof with a pharmaceutically acceptable acid, and pentaerythritol tetranitrate.

The acid addition salts with pharmaceutically acceptable acids of chlordiazepoxide that can be employed include the mineral acid salts, e.g. the hydrochloride, hydrobromide, hydroiodide, sulfate, nitrate, phosphate, etc., and organic acid salts such as the arylsulfonates, e.g. benzene and toluene sulfonates, the citrate, tartrate, acetate, lactate, etc.; the hydrochloride salt or the base being preferred.

The compositions of the invention are prepared by mixing together the two active components and, optionally, pharmaceutical adjuvants, and forming the resulting mixtures into suitable dosage forms. Compositions suitable for oral administration are the known pharmaceutical forms for such administration, e.g. pressed or coated tablets, capsules, oily suspensions, and the pharmaceutical adjuvants used in the production of these formulations are those well known to the pharmacist's art, as are also the means of formulation. Suitable oral compositions include capsules and tablets wherein the active ingredients are mixed with inert fillers, e.g. dicalcium phosphate or lactose in the presence of disintegrating agents, for example, maize starch, and lubricating agents, for example, calcium stearate or talc. Oily suspensions for oral use may be formulated in a suitable vegetable oil, for example, arachis oil, which may contain suitable sweetening agents and preservatives.

The active ingredients of the invention can also be used in rectal suppository form by mixing them with suppository adjuvant material, e.g. fatty acid esters of glycerine, or glycols, e.g. cocoa butter, propylene glycol monostearate, etc., by techniques well known to the art.

The ratio of active ingredients can vary over a wide range, for example, from about 0.4 to about 30, preferably about 1 to about 6 parts by weight of pentaerythritol tetranitrate per part by weight of chlordiazepoxide. A typical adult dosage of active ingredients ranges from about 2 mg. to about 25 mg., preferably from about 5 mg. to about 10 mg., of chlordiazepoxide and from about 10 mg. to about 60 mg., preferably from about 10 mg. to about 30 mg., of pentaerythritol tetranitrate. For example, a hard-shell capsule containing as active ingredients 5 mg. of chlordiazepoxide hydrochloride and 20 mg. of pentaerythritol tetranitrate is administered to a patient three or four times daily. Smaller dosages are, of course, employed for elderly or debilitated patients. The above ranges are not critical, and dosages outside these ranges can be employed.

The following examples are given to illustrate and not limit the invention.

*Example 1*

A tablet is formed from the following ingredients:

| Ingredients: | Mg./tablet |
|---|---|
| Chlordiazepoxide | 5.0 |
| Pentaerythritol tetranitrate [1] | 20.0 |
| Lactose | 72.0 |
| Corn starch | 38.0 |
| Calcium stearate | 2.0 |

[1] (58.0 mg. of a mixture of pentaerythritol tetranitrate containing 35% pentaerythritol tetranitrate and 65% of an inactive clay base, designated SDM-35 from the Atlas Chemical Company, is used.)

The chlordiazepoxide, the pentaerythritol tetranitrate, the lactose and half of the corn starch are blended together in a Pony mixer and are granulated together with a corn starch paste made up of the other half of the corn starch in about 0.11 ml. of water. The granulation is then dried, the calcium stearate added and mixed therewith, and the resulting mixture compressed into tablets using a tablet compressing machine.

The tablets are then coated with a sugar coating in a conventional manner by first applying a barrier of a shellac-alcohol solution and then applying the sugar coating. Alternatively, the tablets can be used without the sugar coating.

*Example 2*

A hard shelled capsule is made up from the following ingredients:

| Ingredients: | Mg./capsule |
|---|---|
| Chlordiazepoxide hydrochloride | 10 |
| Pentaerythritol tetranitrate [1] | 20 |
| Dicalcium phosphate USP | 60 |
| Talc | 7 |
| Magnesium stearate | 3 |

[1] (58.0 mg. of a mixture of pentaerythritol tetranitrate containing 35% pentaerythritol tetranitrate and 65% of an inactive clay base, designated SDM-35 from the Atlas Chemical Company, is used.)

The above ingredients are blended together in a Pony mixer and the resulting mixture inserted into a hard shelled capsule on a conventional capsule filling machine.

*Example 3*

A suppository was formed from the following ingredients:

| Ingredients: | Mg./suppository |
|---|---|
| Chlordiazepoxide hydrochloride | 25 |
| Pentaerythritol tetranitrate [1] | 30 |
| Carnauba wax | 20 |
| Fatty base [2] | 1,520 |

[1] (84 mg. of 35% pentaerythritol tetranitrate in a clay base.)
[2] The fatty base employed is known commercially as Wacobee M, which is a glyceride of coconut fatty acids.

The above ingredients were mixed together by first melting the carnauba wax and the fatty base to 85° C., stirring this mixture well and allowing it to cool to 45° C.

Then the chlordiazepoxide hydrochloride and the pentaerythritol tetranitrate powders are added, the resulting mixture is stirred well, and poured into a chilled mold. The hardened suppository is then wrapped with aluminum foil to protect it from moisture.

Variations in the process and compositions of the invention can be undertaken by those skilled in the art without departing from either the scope or spirit of the invention.

We claim:

1. A therapeutic composition comprising chlordiazepoxide and from about 0.4 to about 30 parts by weight, per part by weight of chlordiazepoxide, of pentaerythritol tetranitrate.

2. A composition of claim 1 which contains pharmaceutical adjuvant material.

3. A composition of claim 1 wherein the chlordiazepoxide is in the form of a salt with a pharmaceutically acceptable acid.

4. A composition of claim 3 wherein the salt of chlordiazepoxide is a hydrochloride salt.

5. A therapeutic composition for internal administration in shaped dosage unit form for oral administration comprising from about 2 mg. to about 25 mg. of chlordiazepoxide and from about 10 mg. to about 60 mg. of pentaerythritol tetranitrate with solid pharmaceutical adjuvant material.

6. A therapeutic composition for internal administration in shaped dosage rectal suppository unit form comprising from about 2 mg. to about 25 mg. of chlordiazepoxide and from about 10 mg. to about 60 mg. of pentaerythritol tetranitrate with rectal suppository adjuvant material.

7. A process for treating a human being suffering from angina pectoris comprising internally administering to said human being a therapeutic composition comprising from about 2 mg. to about 25 mg. of chlordiazepoxide and from about 10 mg. to about 60 mg. of pentaerythritol tetranitrate.

References Cited in the file of this patent

New England J. Med., 261:24, pp. 1236–1239, esp. p. 1236, Dec. 10, 1959.

Modern Drug Encyclopedia and Therapeutic Index, 8th Ed., 1961, p. 671, Feb. 15, 1961.